US011054828B2

(12) United States Patent
Fernandez Guzmann (10) Patent No.: US 11,054,828 B2
(45) Date of Patent: Jul. 6, 2021

(54) SELF-TUNING VEHICLE GUIDANCE SYSTEM

(71) Applicant: AGCO International GmbH, Neuhausen (CH)

(72) Inventor: Benjamin Fernando Fernandez Guzmann, Kempten (DE)

(73) Assignee: AGCO International GmbH, Neuhausen (CH)

( * ) Notice: Subject to any disclaimer, the term of this patent is extended or adjusted under 35 U.S.C. 154(b) by 85 days.

(21) Appl. No.: 16/035,863

(22) Filed: Jul. 16, 2018

(65) Prior Publication Data

US 2019/0018414 A1 Jan. 17, 2019

Related U.S. Application Data

(60) Provisional application No. 62/533,161, filed on Jul. 17, 2017.

(51) Int. Cl.
| | | |
|---|---|---|
| G05D 1/00 | (2006.01) | |
| G05D 1/02 | (2020.01) | |
| A01B 69/04 | (2006.01) | |

(52) U.S. Cl.
CPC ......... G05D 1/0088 (2013.01); A01B 69/008 (2013.01); G05D 1/0212 (2013.01); G05D 2201/0201 (2013.01)

(58) Field of Classification Search
CPC .............. G05D 1/0088; G05D 1/0212; G05D 2201/0201; A01B 69/008
See application file for complete search history.

(56) References Cited

U.S. PATENT DOCUMENTS

| | | | | | |
|---|---|---|---|---|---|
| 4,225,151 A | * | 9/1980 | Taute | ................... | B60K 17/306 180/252 |
| 4,630,508 A | * | 12/1986 | Klatt | ..................... | B60W 30/18 477/900 |

(Continued)

FOREIGN PATENT DOCUMENTS

WO 2013/148160 A2 10/2013

OTHER PUBLICATIONS

M. Hayatolgheibi; A. H. Mazinan; Heading angle and depth control of micro-ROVs using adaptive minimum-degree pole placement (MDPP) approach, Dec. 26, 2016,Department of Control Engineering, South Tehran Branch, Islamic Azad University Tehran Iran (Year: 2016).*

(Continued)

Primary Examiner — Hunter B Lonsberry
Assistant Examiner — Matthew J. Reda (57) ABSTRACT

A control system for an off-road vehicle is configured to provide automatic guidance for the vehicle. The control system is configured to apply an estimator to determine a plurality of system process parameters, determine a reference model based at least in part on user input, determine a plurality of control parameters using the process parameters and the reference model, determine a guidance input according to the control parameters, a setpoint of a desired output, and a previously measured output, and use the guidance input to automatically guide the vehicle. The estimator is configured to determine the plurality of system process parameters such that the control system automatically guides the vehicle so that the vehicle responds substantially in the same manner across different ground surface conditions, hitch forces and vehicle velocities.

10 Claims, 12 Drawing Sheets

(56) References Cited

U.S. PATENT DOCUMENTS

| | | | | |
|---|---|---|---|---|
| 5,187,977 | A * | 2/1993 | Koschorek | G01C 9/00 33/521 |
| 5,465,612 | A * | 11/1995 | La Belle | G01L 5/282 73/116.06 |
| 5,742,919 | A * | 4/1998 | Ashrafi | B60G 17/018 180/197 |
| 5,832,990 | A * | 11/1998 | Eisenhour | G05D 23/1917 165/202 |
| 6,052,647 | A | 4/2000 | Parkinson et al. | |
| 6,173,224 | B1 * | 1/2001 | Riesner | B60R 21/01332 280/735 |
| 6,449,582 | B1 * | 9/2002 | Chaklader | B60C 23/0408 702/101 |
| 7,154,385 | B2 * | 12/2006 | Lee | B62D 5/008 340/431 |
| 9,885,374 | B2 * | 2/2018 | Christensen | B62D 5/07 |
| 2004/0030479 | A1 * | 2/2004 | Arndt | B60T 8/17551 701/70 |
| 2013/0261897 | A1 * | 10/2013 | Potter | B62D 6/00 701/42 |
| 2018/0202380 | A1 * | 7/2018 | Wang | F02D 41/1402 |

OTHER PUBLICATIONS

Derrick et al., Journal of Field Robotics, vol. 26, Nos. 6-7, pp. 519-536, Adaptive Steering Control of a Farm Tractor with Varying Yaw Rate Properties, Published Jun. 1, 2009.

K-M Noh et al., Transactions of the American Society of Agricultural Engineers, vol. 36, No. 6, pp. 1583-1594, Self Tunning Controller for Farm Tractor Guidance, Published Jan. 1, 1993.

European Patent Office, Search Report for Related EP Application No. 18 18 3682, dated Nov. 15, 2018.

* cited by examiner

SELF-TUNING VEHICLE GUIDANCE SYSTEM

RELATED APPLICATIONS

This non-provisional application claims priority benefit with regard to all common subject matter of earlier-filed U.S. Provisional Patent Application Ser. No. 62/533,161, filed on Jul. 17, 2017, and entitled "SELF-TUNING REGULATOR FOR A TRACTOR WITH VARYING SPEED AND HITCH FORCES". The earlier-filed provisional application is hereby incorporated by reference in its entirety into the present application.

BACKGROUND

Efforts to automate or semi-automate farming operations have increased considerably over recent years. Such efforts serve not only to reduce operating costs but also improve working conditions for operators and reduce operator error, enabling gains in operational efficiency and yield. For instance, agricultural machines may employ an automated guidance system to reduce operator fatigue and costs. Automated guidance systems enable traversal through a field based on predetermined lanes which are tracked by comparison with continually updated positional coordinates to enable the guidance system to generate an output for the steering system. One of the difficulties of implementing automated guidance systems for off-road vehicles is that the dynamics of the off-road vehicles are constantly changing. This is due to several factors such as soil irregularities and changes in the vehicle driving speed and hitch load. This makes the design and implementation of a controller a difficult and time-consuming task, since finding a set of controller parameters for every vehicle type and operating situation is nearly impossible.

Known systems use look-up tables that are predetermined by the vehicle manufacturer and are used in a predetermined controller strategy (e.g. a proportional ("P") or "proportional-integral-derivative ("PID") controller) to generate the signals for steering the vehicle. Unfortunately, these pre-defined look-up tables require a substantial amount of time and resources to create and have limited adaptability to changing working conditions (such as, for example, attached implements). Furthermore, ordinary machine operators are generally not able to tune or adjust the behavior of automated guidance systems, such adjusting generally requires skills such as those possessed by an engineer involved in the design of the automated guidance system.

This background discussion is intended to provide information related to the present invention which is not necessarily prior art.

SUMMARY

Embodiments of the present invention solve the above-described and other problems and limitations by providing an off-road vehicle system having a more efficient adaptive controller that saves time in its implementation and parameter tuning and accommodates changes of the vehicle's dynamics in real time.

The self-tuning regulator includes minimum-degree pole placement based on a real-time/online identification of the vehicle dynamics plus a real-time/online computation of control parameters. A linear second order system can be used as a closed-loop reference model and thus the closed-loop yaw rate (output) will behave essentially the same regardless of the changes in the soil conditions and hitch load. The linearity also makes the implementation of the controller in an embedded system less complex and less time consuming. When this method is used to control vehicle yaw rate, it may also use a gain scheduler to control lateral position. However, since the closed-loop yaw rate will tend to behave the same independently of the conditions, a look-up table of the lateral position will need few sets of proportional, integral, and derivative (PID) parameters. Since the identification is based on a general second order system, this method can be applied to different steering systems such as skid-steering, 4 W-steering, and articulated steering. When this method is used to control lateral position directly, no look-up table or PID parameters are needed since the RST parameters will cover the control of the lateral position (output).

An off-road vehicle constructed according to an embodiment of the invention comprises a chassis, a plurality of ground-engaging elements for supporting the chassis on a ground surface and propelling the vehicle along the ground surface, a power source for driving movement of at least one of the ground-engaging elements, and a control system configured to provide automatic guidance for the vehicle by automatically steering the vehicle via at least one of the plurality of ground-engaging elements. The control system is configured to apply an estimator to determine a plurality of system process parameters, the estimator using at least one value generated by the control system and at least one measured vehicle output to determine the plurality of system process parameters in real time during vehicle operation, determine a reference model based at least in part on user input, determine a plurality of control parameters using the process parameters and the reference model, determine a guidance input according to the control parameters, a setpoint of a desired output, and a previously measured output, and use the guidance input to automatically guide the vehicle. The estimator is configured to determine the plurality of system process parameters such that the control system automatically guides the vehicle so that the vehicle responds substantially in the same manner across different ground surface conditions, hitch forces and vehicle velocities.

A method of controlling an off-road vehicle according to another embodiment of the invention comprises applying an estimator to determine a plurality of system process parameters, the estimator using at least one value generated by a vehicle control system and at least one measured vehicle output to determine the plurality of system process parameters in real time during vehicle operation, determining a reference model based at least in part on user input, determining a plurality of control parameters using the process parameters and the reference model, determining a guidance input according to the control parameters, a setpoint of a desired output, and a previously measured output, and using the guidance input to automatically steering the vehicle, the estimator being configured to determine the plurality of system process parameters such that the automatically steering the vehicle occurs so that the vehicle responds substantially in the same manner across different ground surface conditions, hitch forces and vehicle velocities.

This summary is not intended to identify essential features of the present invention, and is not intended to be used to limit the scope of the claims. These and other aspects of the present invention are described below in greater detail.

DESCRIPTION OF THE DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Although the following embodiment shows a vehicle system comprising a Tractor and an implement, the invention can also be used for further vehicle systems such as self-propelled agricultural machines such as Combines or autonomous vehicles such agricultural robots.

Figure 1:
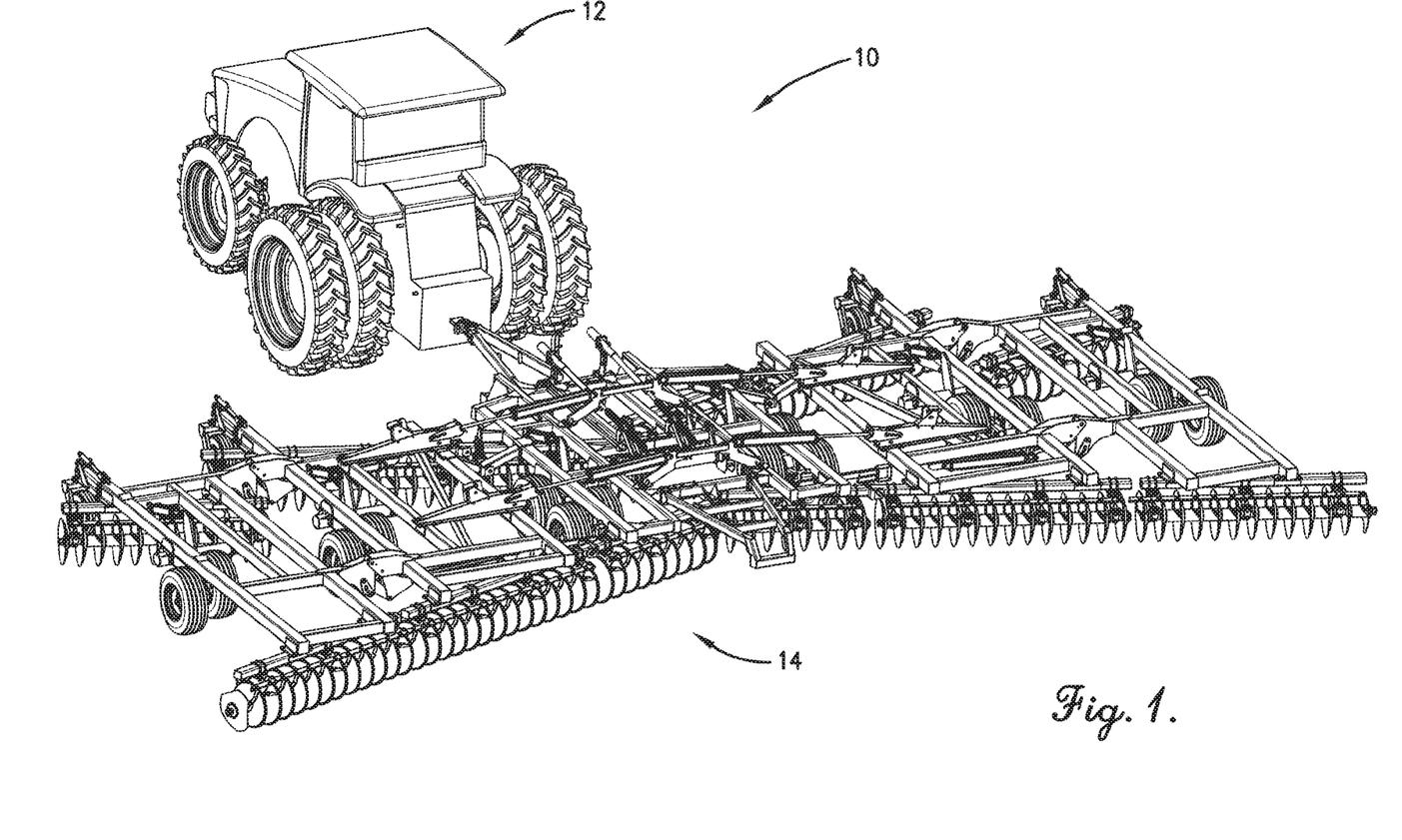
FIG. 1 is a perspective view of an off-road vehicle including an automatic guidance system constructed in accordance with an embodiment of the invention.
Figure 2:
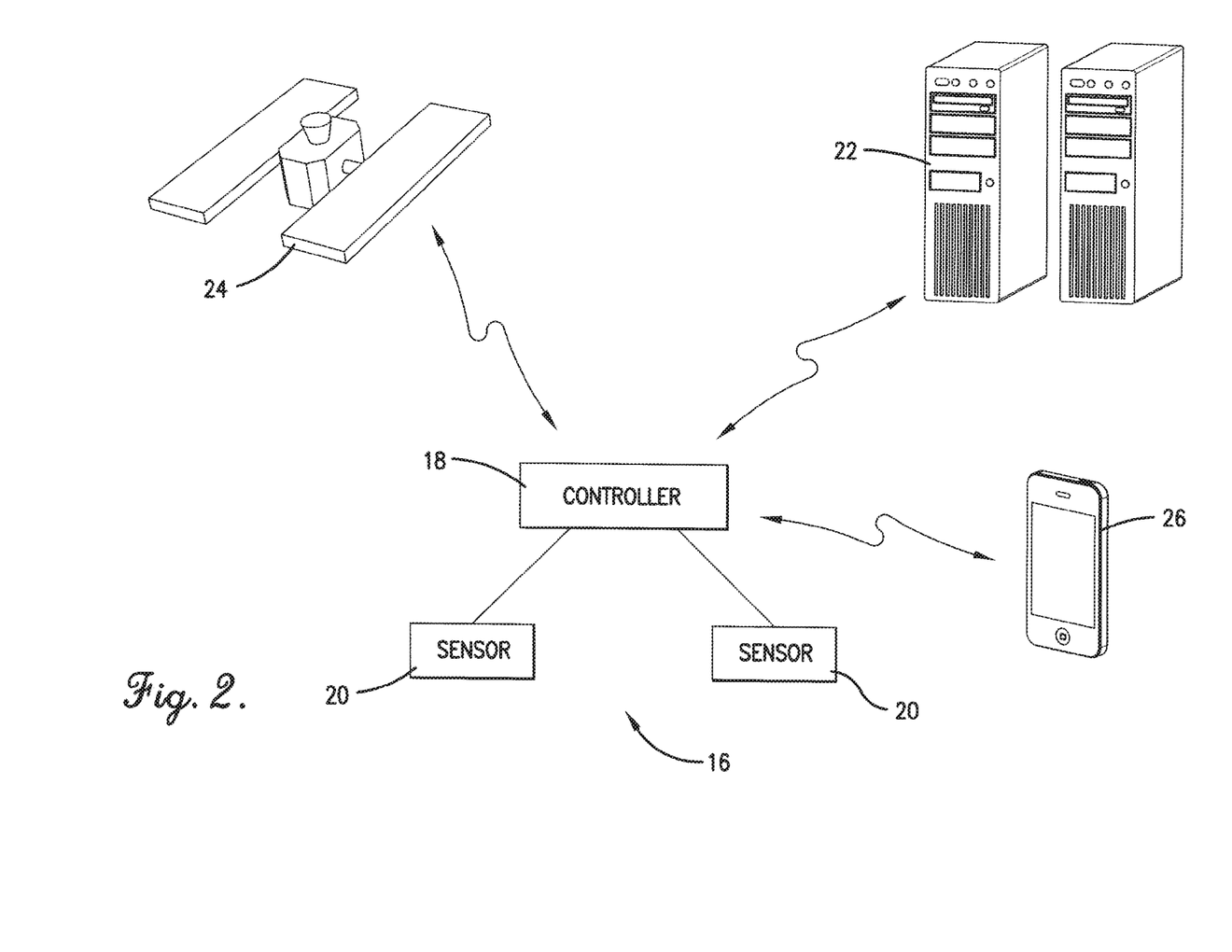
FIG. 2 is a schematic view of various components of a control system associated with the vehicle of FIG. 1.

Turning to FIGS. 1 and 2, an exemplary off-road vehicle system 10 with automatic guidance is illustrated that may be used in accordance with embodiments of the invention. The vehicle system 10 may include a tractor 12 or other off-road towing device and a towed implement 14. The implement 14 may be a plow, a planter, an irrigator, a baler, a harvester, or the like. The vehicle system 10 also includes or is controlled via a control system 16 having a controller 18 and a plurality of sensors 20.

The controller 18 may include computing components such as a processor, a memory, a user interface, a power component, and a communication component for communicating with remote servers or computing systems 22, global navigation satellite systems (GNSS) 24, and/or user input devices 26 over a wireless network. The controller 18 may be integrated with the vehicle system 10 or may be an off-site system configured to control the vehicle system 10 remotely.

The controller 18 may run computer programs preferably comprising ordered listings of executable instructions for implementing logical functions in the controller 18. The computer programs can be stored and/or embodied in or on any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium may be one or more components incorporated into or in remote communication with the controller 18.

The memory may include, for example, removable and non-removable memory elements such as RAM, ROM, flash, magnetic, optical, USB memory devices, and/or other conventional memory elements. The memory may store various data associated with the controller 18, such as the computer program and code segments mentioned above, or other data for performing the steps described herein.

The sensors 20 may be any type of sensing devices such as an inertial measurement units (IMU), VarioGuide/real-time-kinematic (RTK) sensors, GNSS sensors, and the like. The computing systems 22 may be remote servers, desktop computing stations, and the like. The GNSS satellite systems 24 may be any kind of global positioning satellites such as GPS or GLONASS. The user input devices 26 may be desktop computers, laptops, tablets, smartphones, and the like.

Figure 3:
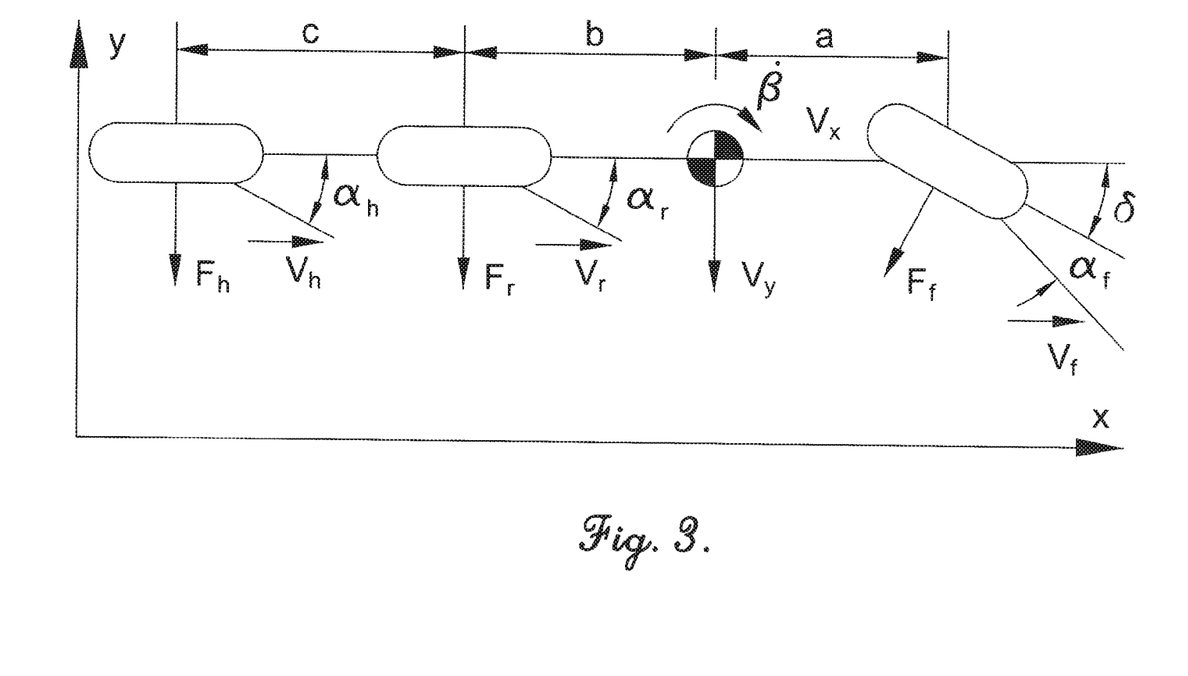
FIG. 3 is a bicycle model used by the automatic guidance system of the vehicle of FIG. 1.

Referring to FIG. 3, the vehicle system 10 can be represented as a 3-wheeled tractor-implement bicycle model. Here, $\dot{\beta}$ is the yaw rate around the center of gravity, $\delta$ is the steering angle and $\alpha_f$, $\alpha_r$ and $\alpha_h$ are the front, rear and hitch slip angles, respectively. The distances from the front and rear axle to the center of gravity are a and b, respectively, and c is the distance from the rear axle to the hitch. Lateral forces at front, rear, and hitch tires are represented by $F_f$, $F_r$ and $F_h$, respectively, and by assuming constant longitudinal velocity ($V_x$), the longitudinal acceleration is null and the longitudinal forces are neglected. Therefore, the yaw rate dynamics of the model represented by FIG. 1, can be expressed by analyzing the simplified lateral dynamics with equation (1).

$$\Sigma F_y = m \cdot a_y$$

$$\Sigma M_{CG} = I_z \cdot \ddot{\beta} \quad (1)$$

From the kinematics point of view, and since the system has null longitudinal acceleration, the lateral acceleration is expressed in Eq. (2).

$$a_y = \dot{V}_y + \dot{\beta} \cdot V_x \quad (2)$$

Substituting into equation (1) and using the small angle approximation, we obtain the following simplified equation of motion:

$$m \cdot (\dot{V}_y + \dot{\beta} \cdot V_x) = F_f + F_r + F_h$$

$$I_z \cdot \ddot{\beta} = a \cdot F_f - b \cdot F_r - (c+b) \cdot F_h \quad (3)$$

Assuming constant lateral forces, their relationship to the slip angles are given in equation (4).

$$F_f = -C_{\alpha_f} \cdot \alpha_f$$

$$F_r = -C_{\alpha_r} \cdot \alpha_r$$

$$F_h = -C_{\alpha_h} \cdot \alpha_h \quad (4)$$

Where $C\alpha_f$, $C\alpha_r$ and $C\alpha_h$ are the front, rear and hitch cornering stiffness and vary depending on the conditions and types of soil. Finally, the simplified transfer function of the yaw rate with respect to the steering angle is presented in equations (5) and (6).

$$G_{\dot{\beta}} = \frac{n_1 s + n_0}{s^2 + d_1 s + d_0} \quad (5)$$

$$n_0 = \frac{C_{\alpha f} \cdot C_1 + a \cdot C_{\alpha f} \cdot C_2}{I_z \cdot m \cdot V_x} \quad (6)$$

$$n_1 = \frac{a \cdot C_{\alpha f}}{I_z}$$

$$d_0 = \frac{C_2 \cdot C_3 - C_1^2}{I_z \cdot m \cdot V_x^2} + \frac{C_1}{I_z}$$

$$d_1 = \frac{C_2}{m \cdot V_x} + \frac{C_3}{I_z \cdot V_x}$$

$$C_1 = (b+c) \cdot C_{\alpha_h} + b \cdot C_{\alpha_r} - a \cdot C_{\alpha_f}$$

$$C_2 = C_{\alpha_h} + C_{\alpha_r} + C_{\alpha_f}$$

$$C_3 = (b+c)^2 \cdot C_{\alpha_h} + b^2 \cdot C_{\alpha_r} - a^2 \cdot C_{\alpha_f}$$

The vehicle system 10 should respond essentially the same regardless of the changes to soil conditions or velocity. For that, an adaptive/self-tuning procedure (i.e., self-tuning regulator) can be used to change the control parameters in such a way that the vehicle system 10 has essentially the same closed-loop response. First, the self-tuning regulator will be described followed by its application to the vehicle system 10.

Figure 4:
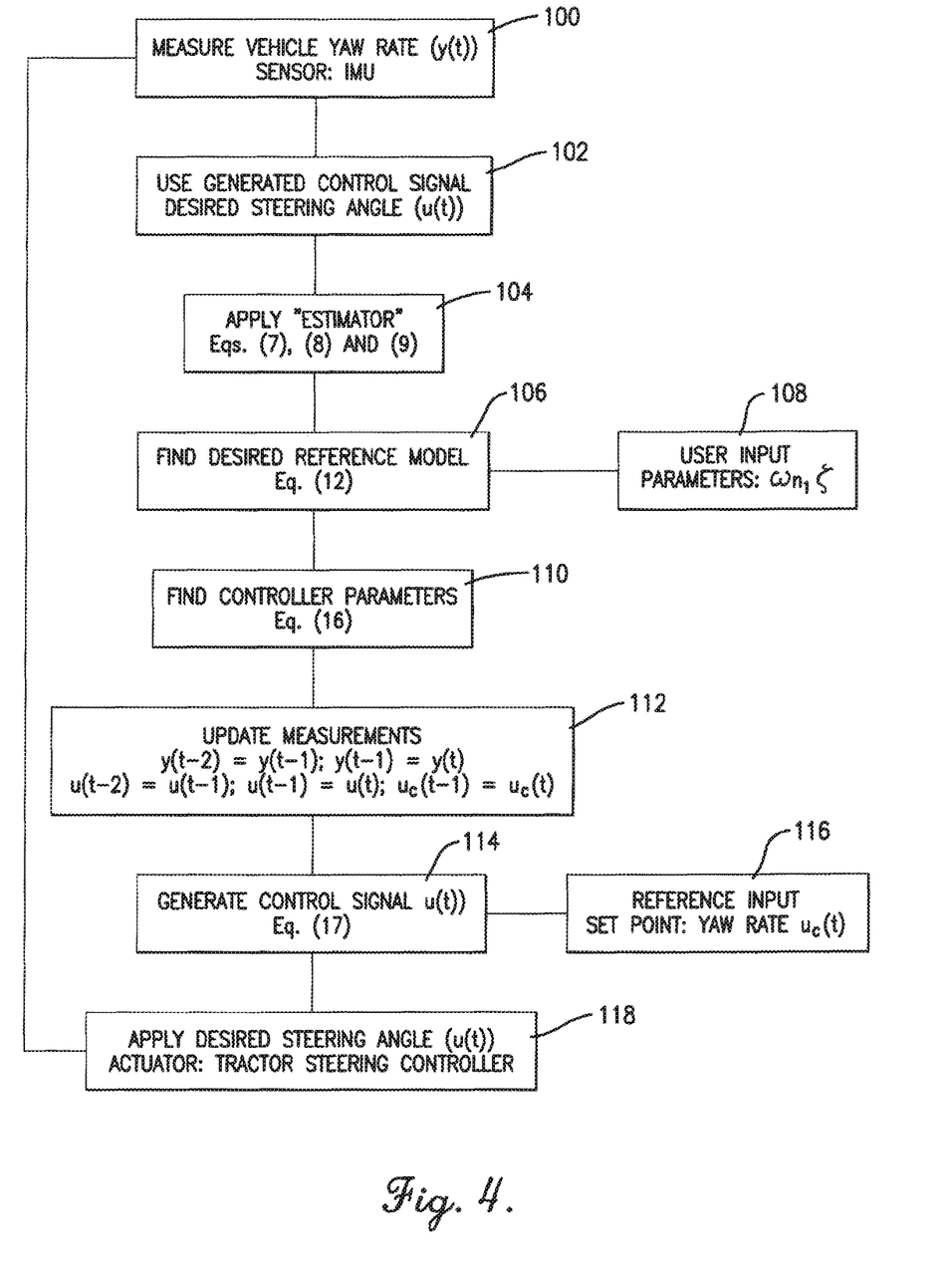
FIG. 4 is a block diagram of a self-tuning regulator used by the automatic guidance system of the vehicle of FIG. 1.

Turning to FIG. 4, the self-tuning regulator is shown. First, a vehicle yaw rate is measured via one of the sensors 20, as shown in block 100. Then a generated control signal including a desired steering angle is used, as shown in block 102. An estimator (see equations (7), (8), and (9) below) is then applied, as shown in block 104. A desired reference model is then found via equation (12), as shown in block 106. Various user input parameters may be used to find the desired reference model, as shown in block 108. The user input may be limited to natural frequency $\omega_n$ and damping ratio $\zeta$, values which can be easily detected by the user without engineering knowledge. The natural frequency $\omega_n$ is a value representing the time needed to arrive at the desired path in case of a deviation. The damping ratio influences overshooting. Generally both values define whether the behavior of the vehicle is more aggressive or less aggressive. Next, controller parameters are found via equation (16), as shown in block 110. Next, measurements are updated as shown in block 112. A new control signal is generated according to equation (17), as shown in block 114. A reference input, specifically a yaw rate set point, may be utilized in this step, as shown in block 116. A desired steering angle is then applied to the tractor 12, as shown in block 118.

Figure 5:
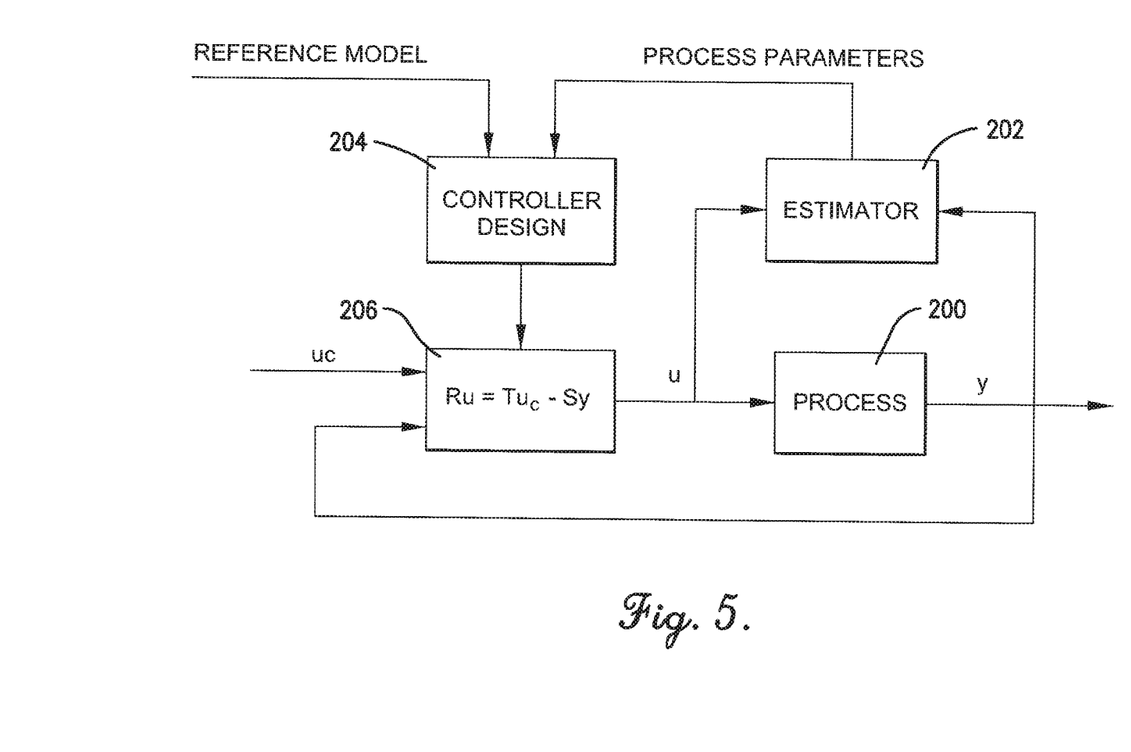
FIG. 5 is a block diagram of an indirect self-tuning regulator in accordance with another embodiment of the invention.

Turning to FIG. 5, an indirect self-tuning regulator is shown. The process of block 200 can be represented by equation (7), which corresponds to a digital form of the equations found previously for the representation of the vehicle system 10 (equations (5) and (6)). Assuming that the parameters of the process are not known a priori, the "estimator" of block 202, represented by equation (8), can be used to find the parameters $a_1$, $a_2$, $b_0$ and $b_1$ on the go by measuring u (desired curvature [1/km] or desired steering angle [deg]) and y (yaw rate). Once having the parameters of the process, the controller design of block 204, represented by Procedure 1 (described below), determines the parameters R, T and S of the controller represented by equation (11) and Block 206, based on the reference model of equation (12), to obtain a desired closed-loop response. Note that uc is the set point of the desired output, i.e., uc=desired yaw-rate and y=measured yaw-rate.

$$\frac{B(q)}{A(q)} = \frac{b_0 q + b_1}{q^2 + a_1 q + a_2} = \text{Process} \quad (7)$$

$$\hat{\theta}(t) = \hat{\theta}(t-1) + K(t-1)\left(y(t) - \varphi^T(t)\hat{\theta}(t-1)\right) \quad (8)$$

$$K(t) = P(t-1)\varphi(t)(\lambda + \varphi^T(t)P(t-1)\varphi(t))^{-1}$$

$$P(t) = (I - K(t)\varphi^T(t))P(t-1)/\lambda$$

Where $0 < \lambda \leq 1$ is the forgetting factor and (t) represents the current estimation or measurement and (t−1) represents the estimation or measurement of the previous cycle time. The system is iterative and the current estimated parameters $\hat{\theta}(t)$ are calculated with the previous estimated values $\hat{\theta}(t-1)$ and with the current vector of measurements $\varphi(t)$ which is constructed by previous measurements (see the following equation (9)).

$$\hat{\theta}(t) = \begin{bmatrix} a_1(t) \\ a_2(t) \\ b_0(t) \\ b_1(t) \end{bmatrix} \quad (9)$$

$$\varphi(t) = [\,-y(t-1) \quad -y(t-2) \quad u(t-1) \quad u(t-2)\,]$$

The initial conditions for the estimation vector and the measurements vector can be zero ($\hat{\theta}(t\,1)=0$; $\varphi(t)=0$) and the initial condition for K(t) and P(t) could be one as follows:

$$K(t-1) = \begin{bmatrix} 1 \\ 1 \\ 1 \\ 1 \end{bmatrix} \quad (10)$$

$$P(t-1) = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

As previously mentioned, the controller may take the following form:

$$R(q) \cdot u = T(q) \cdot u_c - S(q) \cdot y \quad (11)$$

The desired closed-loop response is then based on the following second order reference model:

$$\frac{B_m(q)}{A_m(q)} = \frac{b_{m0}q}{q^2 + a_{m1}q + a_{m2}} \quad (12)$$

The controller design can be used for different vehicles. Procedure 1 (described below) is used to compute the controller parameters R, T, and S assuming that the characteristic equation of the closed-loop feedback system formed by the controller and the process should equal the reference model according to the following Diophantine equation:

$$A(q) \cdot R(q) + B(q) \cdot S(q) = A_m(q) \cdot A_0(q) \quad (13)$$

Procedure 1 is a minimum-degree pole placement (MDPP) used in conjunction with a self-tuning regulator. With polynomials A and B, Procedure 1 ensures closed loop polynomials $A_m$, $B_m$, and $A_o$ as follows: First, an online estimation of polynomials A and B is performed. Then the following compatibility conditions are checked: $\deg A_m = \deg A$; $\deg B_m = \deg B$; $\deg A_o = \deg A - \deg B^+ - 1$; $B_m = B \cdot B'_m$. Then polynomial B is factored as $B = B^+ B^-$, where $B^+$ is monic. Next, solutions R' and S with $\deg S < \deg A$ are found from $AR' + B^- S = A_o A_m$. Then $R = R'B^+$ and $T = A_o B'_m$ are formed. The control signal is then computed from the control law $Ru = Tu_c - Sy$.

Using data from Table 1, the following desired reference model system is used (Eq. (14)), and the tuning parameters to build it correspond to a second order system with a natural frequency $\omega_n = 4$, a damping ratio $\zeta = 0.8$ taken from user input as shown in block 108 in FIG. 4, and a sampling time of 40 [ms].

TABLE 1

Technical data of a Fendt Tractor Model Vario 939.

| | Tractor data |
|---|---|
| a | 1.6965 [m] |
| b | 3.9585 [m] |
| c | 2.1900 [m] |
| m | 18000 [kg] |
| $I_{zz}$ | 59312 [kg-m] |
| $C_{af}$ | 3600 [N/deg] |
| $C_{ar}$ | 6250 [N/deg] |
| $C_{ah}$ | 0-5000 [N/deg] |
| $V_x$ | 2-15 [m/s] |

If the vehicle system does not include an implement, the estimator would recognize that and deliver a table similar to TABLE 1 except the value for $C_{ah}$ would be zero. The depending equations would still be applicable.

$$\frac{B_m}{A_m} = \frac{0.0225q}{q^2 - 1.7512q + 0.7737} \quad (14)$$

Applying the minimum-degree pole placement self-tuning procedure (Procedure 1), we first identify the polynomials A and B of the system with the aid of equations (8) and (9). Checking the compatibility condition, one sees that $\deg A_m = \deg A = 2$; $\deg B_m = \deg B = 1$; $\deg A_o = \deg A - \deg B^+ - 1 = 1$ which implies that $\deg B^+ = 0$. Therefore factoring B makes $B^+ = 1$; $B^- = B = b_0 q + b_1$ and $A_0 = 1$. Therefore, the reduced Diophantine equation (Eq. (13)) is as follows:

$$(q^2 + a_1 q + a_2)(q + r_1) + (b_0 q + b_1)(s_0 q + s_1) = (q^2 + a_{m1} q + a_{m2})(q + a_0) \quad (15)$$

Solving R, S, and T for each cycle, the control signal u is calculated online given the reference set point $u_c$ as follows:

$$r_1 = \frac{b_1}{b_0} + \frac{(b_1^2 - a_{m1} b_0 b_1 + a_{m2} b_0^2)(-b_1 + a_0 b_0)}{b_0 (b_1^2 - a_1 b_0 b_1 + a_2 b_0^2)} \quad (16)$$

$$s_0 = \frac{b_1(a_0 a_{m1} - a_2 - a_{m1} a_1 + a_1^2 + a_{m1} - a_1 a_0)}{b_1^2 - a_1 b_0 b_1 + a_2 b_0^2} +$$
$$\frac{b_0(a_{m1} a_2 - a_1 a_2 - a_0 a_{m2} + a_0 a_2)}{b_1^2 - a_1 b_0 b_1 + a_2 b_0^2}$$

$$s_1 = \frac{b_1(a_1 a_2 - a_{m1} a_2 + a_0 a_{m2} - a_0 a_2)}{b_1^2 - a_1 b_0 b_1 + a_2 b_0^2} +$$
$$\frac{b_0(a_2 a_{m2} - a_2^2 - a_0 a_{m2} a_1 + a_0 a_2 a_{m1})}{b_1^2 - a_1 b_0 b_1 + a_2 b_0^2}$$

$$T(q) = \beta(q + a_0)$$

$$\beta = \frac{1 + a_{m1} + a_{m2}}{b_0 + b_1}$$

$$t_0 = \beta$$

$$t_1 = a_1 \cdot \beta$$

$$u(t) = -r_1 \cdot u(t-1) + t_0 \cdot u_c(t) + t_1 u_c(t-1) - s_0 \cdot y(t) - s_1 \cdot y(t-1) \quad (17)$$

The closed-loop yaw dynamics should follow the reference model of equation (14) using Procedure 1. For that, equation (11) can be rewritten in the form of $R \cdot \delta = T \cdot \dot{\beta}_{desired} - S \cdot \dot{\beta}_{measured}$, where R, S and T are the control parameters to be updated online.

Figure 6A:
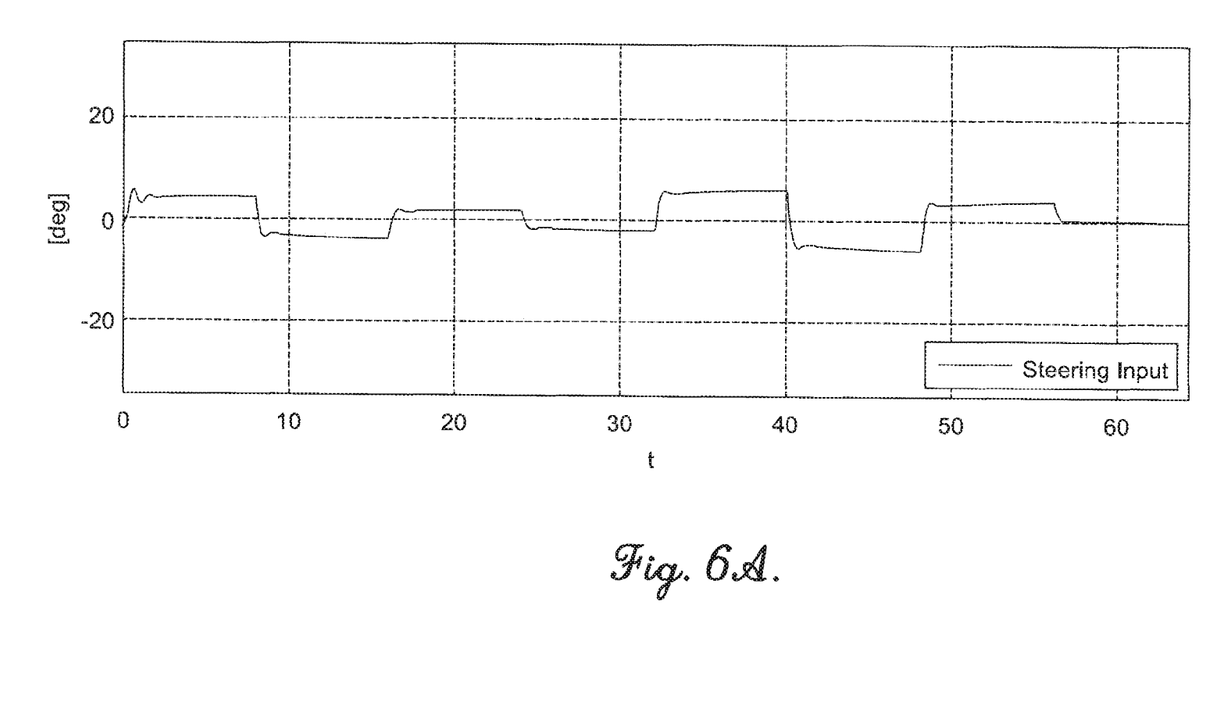
FIG. 6A is a graph of self-tuning regulator data for $V_x=2$ [m/s] and $C_{ah}=300$ [N/deg] showing steering input in [deg]
Figure 6B:
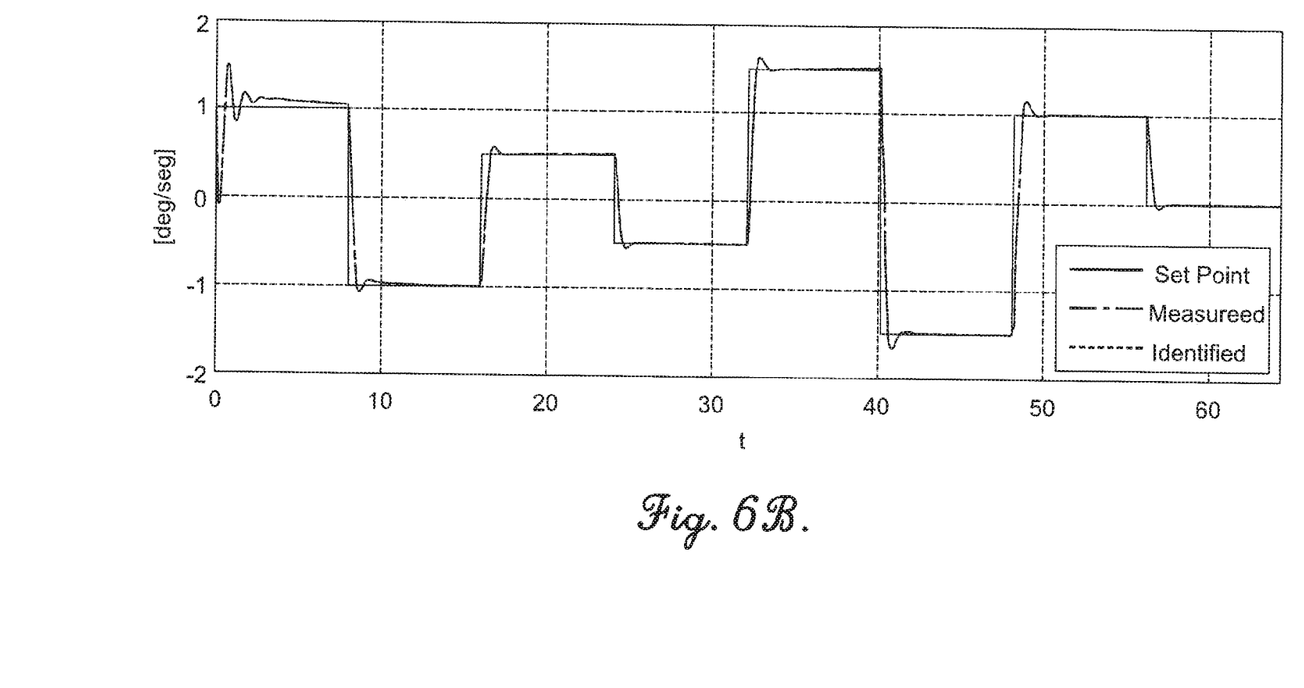
FIG. 6B is a graph of self-tuning regulator data for $V_x=2$ [m/s] and $C_{ah}=300$ [N/deg] showing yaw rate in [deg/seg]

FIG. 6B shows a row of desired set points ($\dot{\beta}_{desired}$) to be followed by the vehicle system 10 driving at 3.6 [k/h]. For this scenario, a cornering stiffness of 300 [N/deg] at the hitch represents an implement of relatively low load. Given a low initial value of the parameters to be identified (e.g. 0.1), the yaw rate of the vehicle is measured ($\dot{\beta}_{measured}$) and used to identify the vehicle system 10 with the aid of equation (8). Then, the identified parameters are used iteratively to calculate the new control parameters R, T and S (Eq. (16)). This can be noticed in the first seconds where the measured and the identified lines present some abrupt changes until the identified parameters converge and the correct control parameters are calculated stabilizing the system.

Figure 7A:
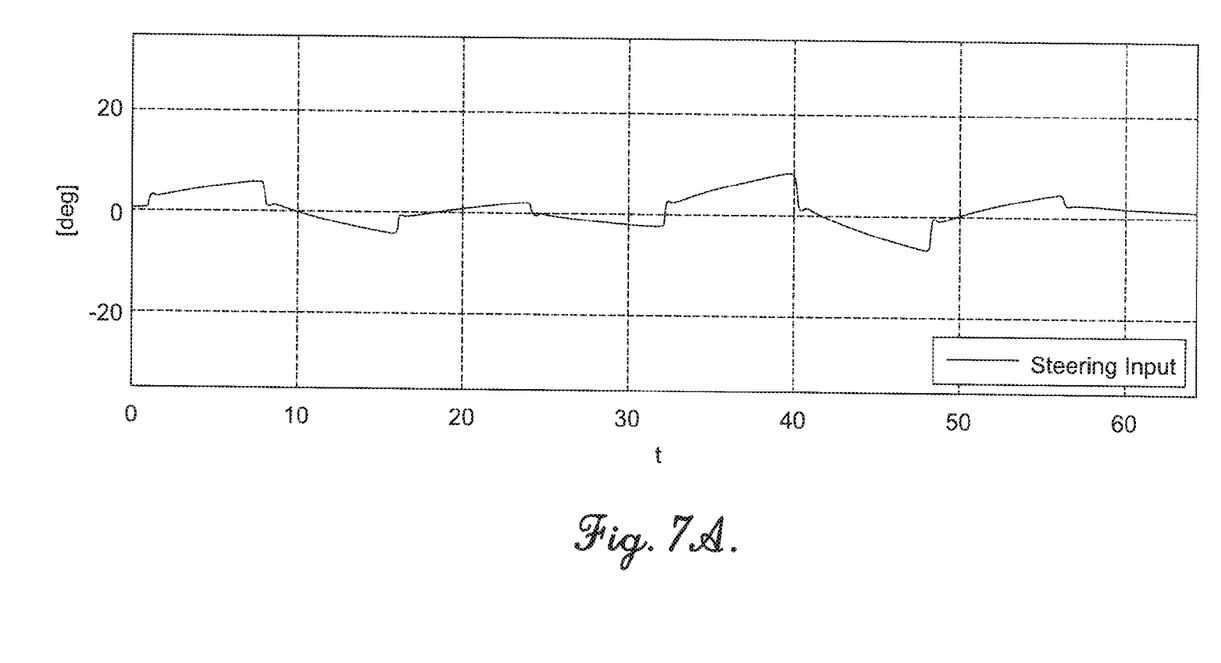
FIG. 7A is a graph of self-tuning regulator data for $V_x=5$ [m/s] and $C_{ah}=1000$ [N/deg] showing steering input in [deg]
Figure 7B:
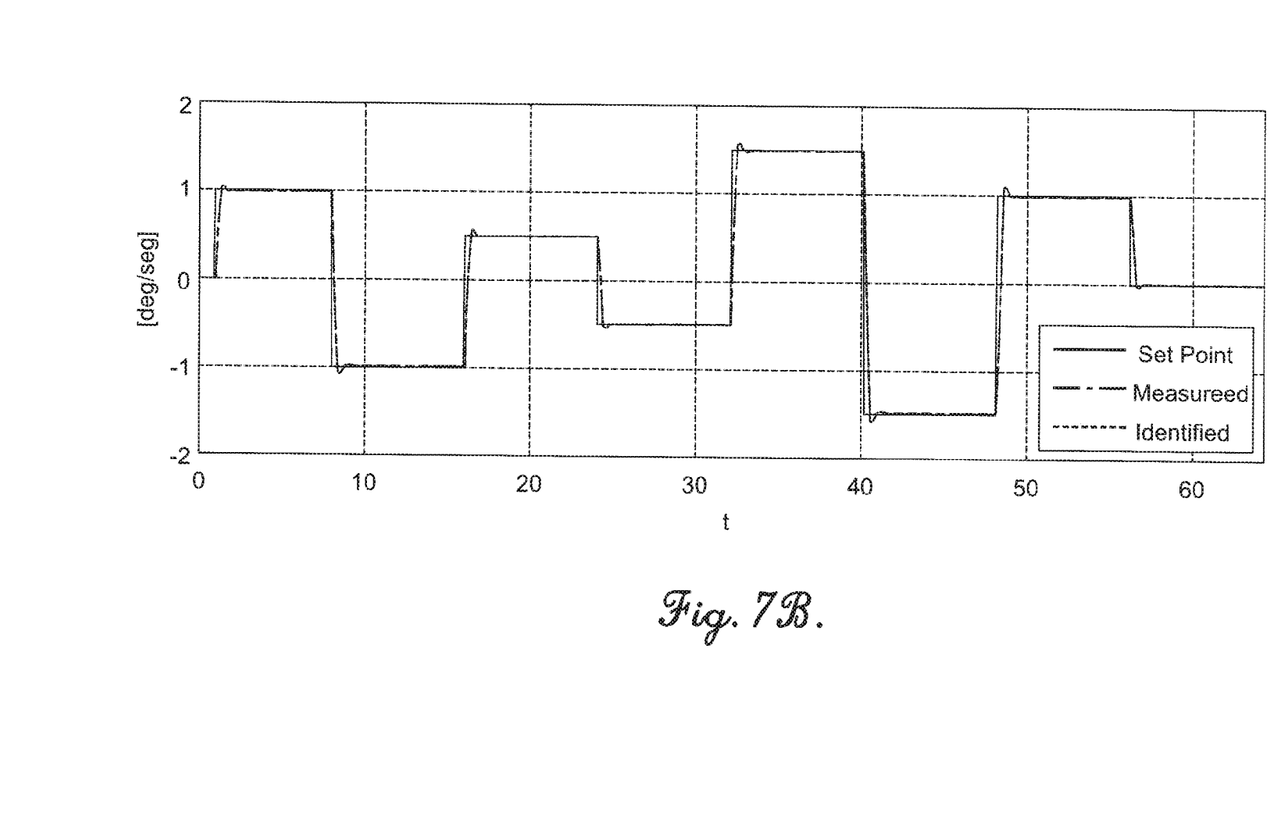
FIG. 7B is a graph of self-tuning regulator data for $V_x=5$ [m/s] and $C_{ah}=1000$ [N/deg] showing yaw rate in [deg/seg]

FIG. 6A presents the form of the control signal δ [deg]) applied to the steering system of the tractor 12 that results in the data of FIG. 6B. It can be observed that small steering angles (2 to 8 degrees) are enough to bring the tractor 12 to the desired yaw rates. FIGS. 7A and 7B shows the same tractor 12 driving at higher speed and having bigger load at the hitch. Here, the steering input to be applied has to be bigger to compensate for those changes.

Figure 8A:
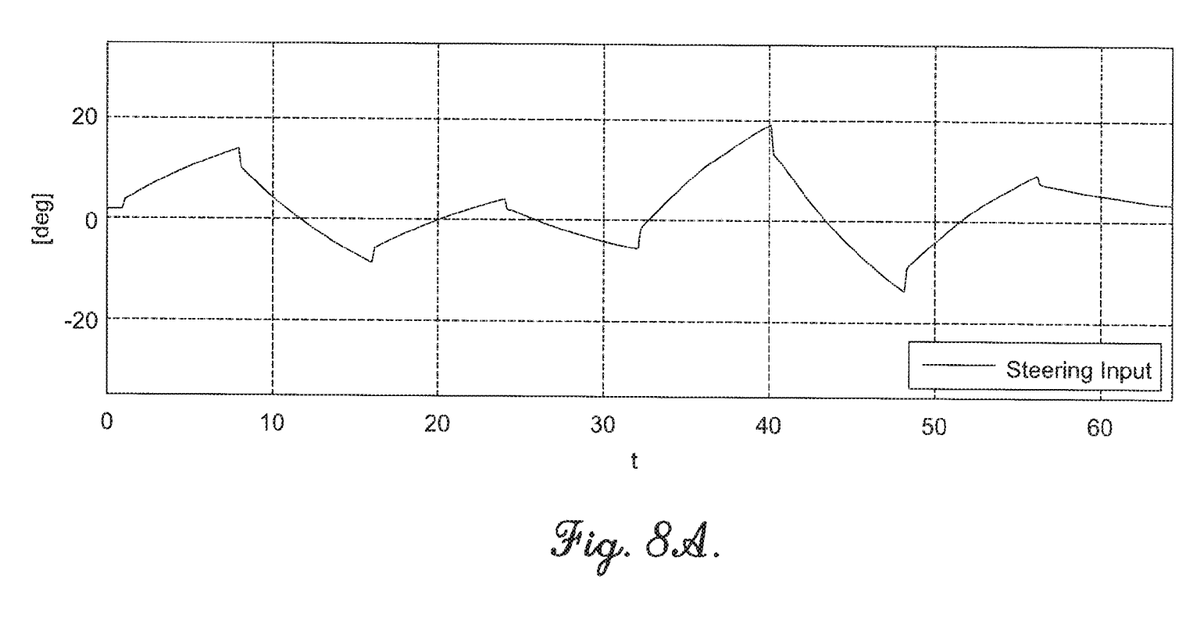
FIG. 8A is a graph of self-tuning regulator data for $V_x=10$ [m/s] and $C_{ah}=3000$ [N/deg] showing steering input in [deg]
Figure 8B:
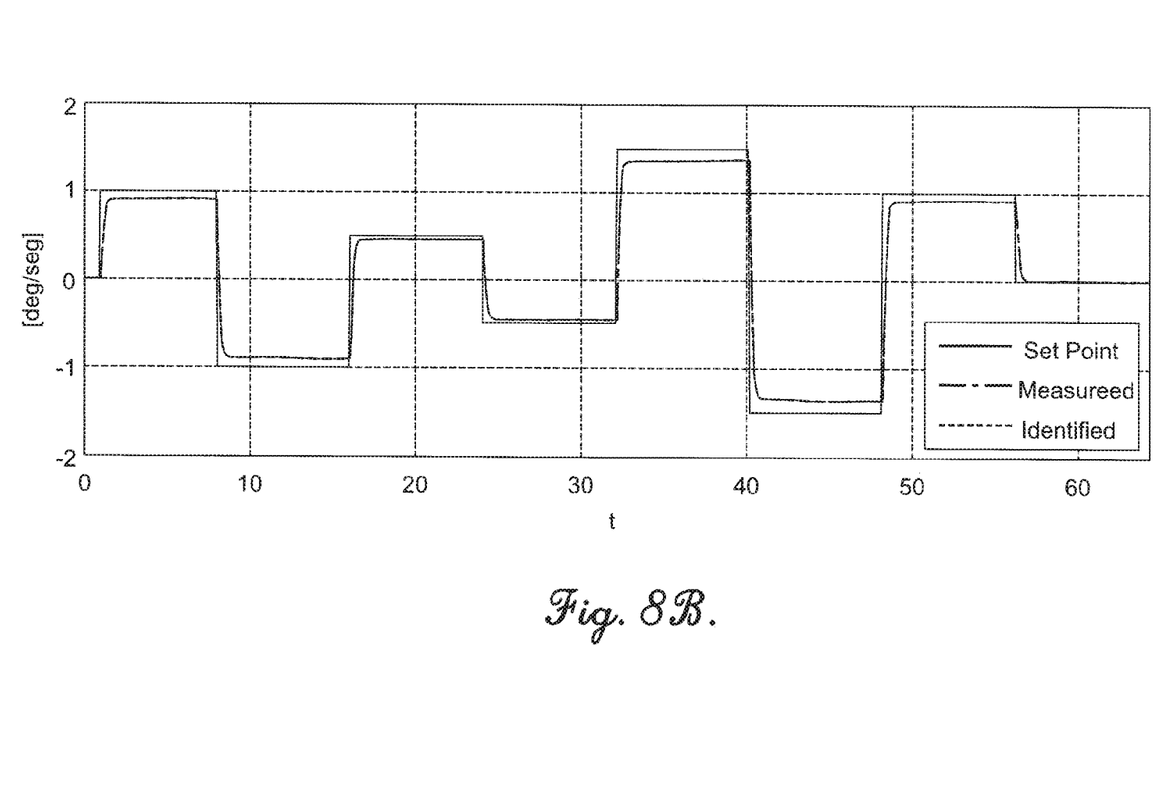
FIG. 8B is a graph of self-tuning regulator data for $V_x=10$ [m/s] and $C_{ah}=3000$ [N/deg] showing yaw rate in [deg/seg]

Normally one could expect that at higher velocities, the vehicle is more sensitive to small changes in the steering input. Nevertheless, FIGS. 7A-8B show that as the cornering stiffness increases, so does the amplitude of the steering angle. Also, with higher values of cornering stiffness, the adaptive steering input increases gradually as a ramp to maintain the same yaw rate, whereas at lower values the input takes more the form of a step. As a result, this shows that the procedure adapts the control signal quite well to the different velocities and hitch cornering stiffness. It is very important to mention, that the adaptation depends on the identified system. For instance, FIGS. 8A and 8B show that the measured signal follows the identified signal quite well. Nevertheless, the identified signal deviates from the original one producing a steady state error.

Figure 9:
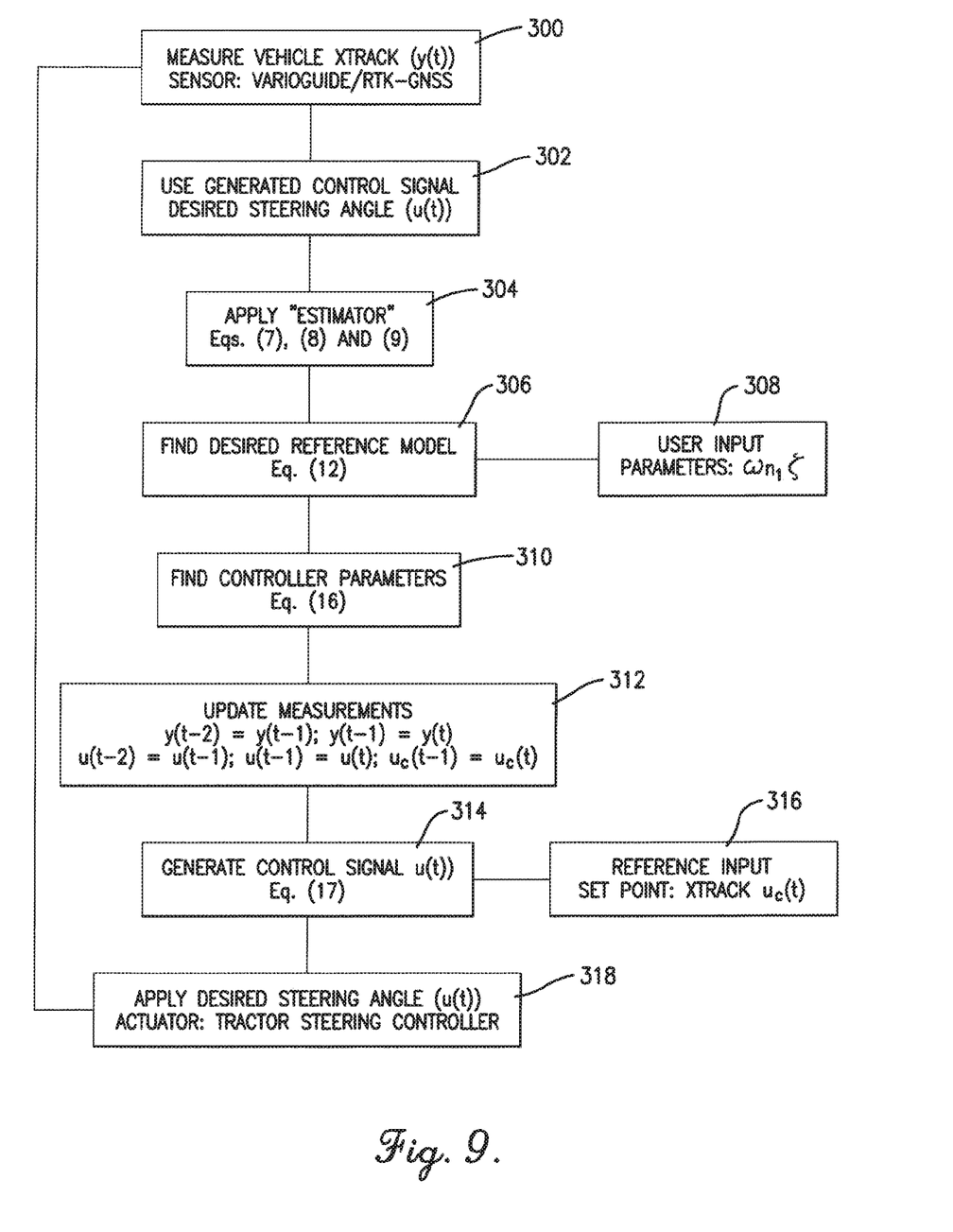
FIG. 9 is a block diagram of a self-tuning regulator with lateral position (Xtrack) being the signal to be controlled.

Turning to FIG. 9, a flow diagram to control the lateral position or "Xtrack" is shown. The process of controlling the lateral position is similar to controlling the yaw rate of FIG. 4. However, in this case, the set point uc represents the desired lateral position (normally 0 if the vehicle stays on the lane), and the output y represents the measured lateral positions. The control signal u will still be the desired curvature in [1/km] (the same as the one used for the yaw rate control) or the desired steering angle in [deg]. Then, the estimator will be using the desired steering signal and the measured lateral position as inputs for the identification. As for the previous methodology, one has to use a slower natural frequency (for instance $\omega_n=1$ could be a good option) instead of using a $\omega_n$ of 4.

First, a vehicle lateral position is measured via one of the sensors 20, as shown in block 300. Then a generated control signal including a desired steering angle is used, as shown in block 302. An estimator (equations (7), (8), and (9)) is then applied, as shown in block 304. A desired reference model is then found via equation (12), as shown in block 306. Various user input parameters may be used to find the desired reference model, as shown in block 308. Next, controller parameters are found via equation (16), as shown in block 310. Next, measurements are updated as shown in block 312. A new control signal is generated according to equation (17), as shown in block 314. A reference input, specifically a lateral position set point, may be utilized in this step, as shown in block 316. A desired steering angle is then applied to the tractor 12, as shown in block 318.

It will be appreciated that embodiments of the invention set forth herein are operable to automatically guide a vehicle in such a way that it can automatically and dynamically adapt to different operating conditions in real time and without user input such that the vehicle responds or behaves in substantially the same manner regardless of the operating conditions, even if those operating conditions change during operation of the vehicle. Different operating conditions may include virtually anything that would cause the vehicle to respond or behave differently under the same machine settings such as steering angle or motive power. Operating conditions may include, without limitation, implements attached to the vehicle (or lack thereof), fill levels of tanks or bins on the vehicle or an implement, and ground and surface conditions including hardness, smoothness and slope of the ground. By way of example a tractor operating without an implement may follow a first curve with a first radius when the wheels are set at a given steering angle. When an implement is attached to the tractor it may follow a second curve with a second radius when the wheels are set at the same steering angle. Operating conditions may change during a single operation, such as when an applicator tank on an implement towed by a tractor is gradually depleted of liquid during an application operation. In this example, as the tank level decreases the weight of the implement also decreases and causes the tractor and implement system to respond differently to changes in steering angle.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. An off-road vehicle comprising:
a chassis;
a plurality of ground-engaging elements for supporting the chassis on a ground surface and propelling the vehicle along the ground surface;
a power source for driving movement of at least one of the ground-engaging elements; and
a control system configured to provide automatic guidance for the vehicle by automatically steering the vehicle via at least one of the plurality of ground-engaging elements, the control system configured to—
apply an estimator to determine a plurality of system process parameters, the estimator using at least one value generated by the control system and at least one measured vehicle output to determine the plurality of system process parameters in real time during vehicle operation,
determine a reference model based at least in part on the control parameters, the reference model including values for front, rear and hitch cornering stiffness, the reference model being defined according to the following equation:

$$G_{\hat{\beta}} = \frac{n_1 s + n_0}{s^2 + d_1 s + d_0}$$

wherein $$n_0 = \frac{C_{af} \cdot C_1 + a \cdot C_{af} \cdot C_2}{I_z \cdot m \cdot V_x}$$

$$n_1 = \frac{a \cdot C_{af}}{I_z}$$

$$d_0 = \frac{C_2 \cdot C_3 - C_1^2}{I_z \cdot m \cdot V_x^2} + \frac{C_1}{I_z}$$

$$d_1 = \frac{C_2}{m \cdot V_x} + \frac{C_3}{I_z \cdot V_x}$$

$$C_1 = (b+c) \cdot C_{a_h} \cdot C_{a_f} + b \cdot C_{a_r} - a \cdot C_{a_f}$$

$$C_2 = C_{a_h} + C_{a_r} + C_{a_f}$$

$$C_3 = (b+c)^2 \cdot C_{a_h} + b^2 \cdot C_{a_r} - a^2$$

determine a plurality of control parameters using the process parameters and the reference model, the control parameters being at least one of R, S and T values,
determine a guidance input u using the R, S and T values according to the equation Ru=Tu$_c$−Sy, wherein $u_c$ is the desired yaw rate or desired lateral position and y is the measured yaw rate or measured lateral position, and use the guidance input to automatically guide the vehicle, the estimator being configured to determine the plurality of system process parameters such that the control system automatically guides the vehicle so that the vehicle responds substantially in the same manner across different ground surface conditions, hitch forces and vehicle velocities.

2. The off-road vehicle as set forth in claim 1, wherein the value generated by the control system is a desired steering angle.

3. The off-road vehicle as set forth in claim 1, wherein the reference model is linear.

4. The off-road vehicle as set forth in claim 3, wherein the reference model is a second order system.

5. The off-road vehicle as set forth in claim 1, wherein the controller is further configured to determine the plurality of control parameters using minimum-degree pole placement (MDPP).

6. A method of controlling an off-road vehicle, the method comprising:

applying an estimator to determine a plurality of system process parameters, the estimator using at least one value generated by a vehicle control system and at least one measured vehicle output to determine the plurality of system process parameters in real time during vehicle operation, determining a reference model based at least in part on user input, the reference model including values for front, rear and hitch cornering stiffness, the reference model being defined according to the following equation:

$$G_\beta = \frac{n_1 s + n_0}{s^2 + d_1 s + d_0}$$

wherein $$n_0 = \frac{C_{af} \cdot C_1 + a \cdot C_{af} \cdot C_2}{I_z \cdot m \cdot V_x}$$

-continued $$n_1 = \frac{a \cdot C_{af}}{I_z}$$

$$d_0 = \frac{C_2 \cdot C_3 - C_1^2}{I_z \cdot m \cdot V_x^2} + \frac{C_1}{I_z}$$

$$d_1 = \frac{C_2}{m \cdot V_x} + \frac{C_3}{I_z \cdot V_x}$$

$$C_1 = (b+c) \cdot C_{\alpha_h} \cdot C_{\alpha_f} + b \cdot C_{\alpha_r} - a \cdot C_{\alpha_f}$$

$$C_2 = C_{\alpha_h} + C_{\alpha_r} + C_{\alpha_f}$$

$$C_3 = (b+c)^2 \cdot C_{\alpha_h} + b^2 \cdot C_{\alpha_r} - a^2$$

determining a plurality of control parameters using the process parameters and the reference model, the control parameters being at least one of R, S and T values, determining a guidance input u using the R, S and T values according to the equation $Ru = Tu_c - Sy$, wherein $u_c$ is the desired yaw rate or desired lateral position and y is the measured yaw rate or measured lateral position, and using the guidance input to automatically steering the vehicle, the estimator being configured to determine the plurality of system process parameters such that the automatically steering the vehicle occurs so that the vehicle responds substantially in the same manner across different ground surface conditions, hitch forces and vehicle velocities.

7. The method as set forth in claim 6, wherein the value generated by the vehicle control system is a desired steering angle.

8. The method as set forth in claim 6, wherein the reference model is linear.

9. The method as set forth in claim 8, wherein the reference model is a second order system.

10. The method as set forth in claim 6, wherein the plurality of control parameters are determined using minimum-degree pole placement (MDPP).

\* \* \* \* \*